United States Patent
Metzler et al.

(10) Patent No.: US 8,734,635 B2
(45) Date of Patent: May 27, 2014

(54) METHOD FOR INHIBITING FOULING IN VAPOR TRANSPORT SYSTEM

(71) Applicant: Baker Hughes Incorporated, Houston, TX (US)

(72) Inventors: Roger D. Metzler, Sugar Land, TX (US); Zhenning Gu, Sugar Land, TX (US); Bradley Harrell, Pearland, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 13/920,848

(22) Filed: Jun. 18, 2013

(65) Prior Publication Data

US 2013/0277606 A1  Oct. 24, 2013

Related U.S. Application Data

(62) Division of application No. 13/169,572, filed on Jun. 27, 2011, now Pat. No. 8,465,640.

(60) Provisional application No. 61/586,090, filed on Jan. 12, 2012.

(51) Int. Cl.
| | |
|---|---|
| *C10G 75/02* | (2006.01) |
| *C10G 75/04* | (2006.01) |
| *C09K 15/06* | (2006.01) |
| *C09K 15/22* | (2006.01) |
| *C09K 15/26* | (2006.01) |
| *C09K 15/20* | (2006.01) |
| *C09K 15/18* | (2006.01) |

(52) U.S. Cl.
USPC ............ 208/48 AA; 208/48 R; 252/388; 252/390; 252/180; 252/389.62; 252/394; 585/950; 585/648; 210/698; 106/14.15; 106/14.16; 427/427.7

(58) Field of Classification Search
USPC ............ 208/48 R, 48 AA; 585/648, 950; 106/14.15, 14.16; 427/427.7; 210/698; 252/180, 388, 390, 391, 392, 389.62, 252/394

See application file for complete search history.

(56) References Cited

U.S. PATENT DOCUMENTS

| | | | |
|---|---|---|---|
| 3,105,810 A | 10/1963 | Miller et al. | |
| 3,405,054 A | 10/1968 | Arkis et al. | |
| 3,489,682 A | 1/1970 | Lesuer | |
| 4,107,030 A | 8/1978 | Slovinsky et al. | |
| 4,349,068 A * | 9/1982 | Coury | 165/104.27 |
| 4,578,178 A | 3/1986 | Forester | |
| 4,775,458 A | 10/1988 | Forester | |
| 4,902,824 A | 2/1990 | Syrinek | |
| 4,927,561 A | 5/1990 | Forester | |
| 5,433,757 A | 7/1995 | Song et al. | |
| 5,435,904 A * | 7/1995 | Reed et al. | 208/48 AA |
| 5,435,926 A | 7/1995 | Gutierrez et al. | |
| 5,681,799 A | 10/1997 | Song et al. | |
| 5,710,329 A | 1/1998 | Clever | |
| 5,746,924 A | 5/1998 | Cooper et al. | |
| 5,759,967 A | 6/1998 | Song et al. | |
| 5,944,961 A * | 8/1999 | Gandman | 202/241 |
| 6,270,656 B1 * | 8/2001 | Gibson et al. | 208/131 |
| 6,517,617 B1 * | 2/2003 | Chartier et al. | 106/14.42 |
| 2008/0028979 A1 * | 2/2008 | Stark et al. | 106/14.18 |
| 2008/0245233 A1 * | 10/2008 | Gu et al. | 95/149 |

* cited by examiner

*Primary Examiner* — Joseph D Anthony

(74) *Attorney, Agent, or Firm* — Mossman, Kumar & Tyler, PC

(57) ABSTRACT

Elimination and/or mitigation of fouling in a vapor transport systems, such as vent lines and scrubber feed lines may be accomplished using an antifouling additive. The method for employing the antifouling additive includes introducing into the vapor transport system an additive including a polar solvent and corrosion inhibitor wherein: the vapor transport system is substantially water free; the vapor transport system is used to transport acidic materials; the additive is a liquid at vapor transport system operating conditions; and the additive is stable at the vapor transport system operating conditions.

12 Claims, No Drawings

METHOD FOR INHIBITING FOULING IN VAPOR TRANSPORT SYSTEM

CROSS-REFERENCE TO RELATED APPLICATIONS

This application is a divisional of U.S. Pat. No. 8,465,640, filed Jun. 27, 2011, which claims priority from U.S. Provisional Patent Application Ser. No. 61/363,928 filed on Jul. 13, 2010, the disclosures of which are incorporated herein by reference in its entirety.

BACKGROUND OF THE INVENTION

1. Field of the Invention

The invention relates to a method for inhibiting fouling in vapor transport systems. The invention particularly relates to the use of additives for inhibiting fouling in vapor transport systems.

2. Background of the Art

Acidic materials may be difficult to use in the manufacture of chemicals and other products. Unless kept anhydrous, these materials may be very corrosive and thus requiring the use of exotic, fragile, and/or very expensive materials in the construction of units employing them. For example, anhydrous HCl is relatively non-corrosive, but introduce even a small amount of water or other compound that can form a hydronium ion, or its analog, and use of glass lined pipe may be required for safe handling.

This problem is not limited to literal acids, but also extends to compounds that can generate acids. One example of this is anhydrides. Unsaturated anhydrides are common components of, for example, copolymers. In an anhydrous environment, these compounds are comparatively stable and non-corrosive. In the presence of water however, they are quickly converted to acids and may be very corrosive.

It is often desirable to handle these compounds as vapor. One problem with handling these vapors is that solids may form and be deposited on the surfaces of the systems used to transport the vapor. If not corrected, this can result in plugging. The foulants are often removed mechanically which may cause substantial losses of productivity.

Care should be employed that solutions to problems within a vapor transport system not cause new problems downstream. For example, in many processes utilizing a vapor transport system it may be desirable to scrub the vapor stream. Gas/Vapor Scrubbers are devices used for separating components of a gas admixture. In some embodiments, these devices are used to "purify" gasses/vapors or, stated in the alternative, remove undesirable components from a gas/vapor stream. For example, primitive scrubbers have been used since the inception of submarine warfare to remove carbon dioxide from the air supply in the submarine.

More recently, gas scrubbers have proven to be essential in many industries. For example, Gas Scrubbers are used to prevent pollution from the burning of coal during power generation. Gas Scrubbers are also used to remove undesirable components from process gas streams during the production of chemicals, metals and devices such as semiconductors and the like.

Care should be taken to avoid solutions to plugging problems in a vapor transport system that will result in problems with downstream scrubbers.

SUMMARY OF THE INVENTION

In one aspect, the invention is a method for the prevention or mitigation of fouling in vapor transport systems comprising introducing into the vapor transport system an additive comprising a polar solvent and corrosion inhibitor wherein: the vapor transport system is substantially water free; the vapor transport system is used to transport acidic materials; the additive is a liquid at vapor transport system operating conditions; and the additive is stable at the vapor transport system operating conditions.

In another aspect, the invention is a method for the production of chemical compositions comprising transporting anhydrous vapor through metal pipes and introducing therein an additive comprising a polar solvent and corrosion inhibitor wherein: the vapor transport system is substantially water free; the vapor transport system is used to transport acidic materials; the additive is a liquid at vapor transport system operating conditions; and the additive is stable at the vapor transport system operating conditions.

DESCRIPTION OF THE PREFERRED EMBODIMENTS

One embodiment of the invention is a method for the prevention or mitigation of fouling in vapor transport systems comprising introducing into a vapor transport system an additive comprising a polar solvent and corrosion inhibitor. Examples of polar solvent useful with the methods of the application may include, but are not limited to: aliphatic alcohols, aliphatic amides and lactams, aliphatic ethers, and combinations thereof. When the polar solvent is an aliphatic alcohol, in some embodiments it may have from 2 to 14 carbons. In some embodiments the aliphatic alcohols may be selected from the group consisting of ethanol, n-propanol, isopropanol, n-butanol, tert-butanol, isobutanol, and mixtures thereof. In other embodiments, especially higher temperature applications, the aliphatic alcohol may be selected from the group consisting of n-pentanol, n-hexanol, n-heptanol, n-octanol, n-decanol, n-dodecanol (lauryl alcohol), 2-ethylhexanol, stearyl alcohol, cetyl alcohol, lauryl alcohol, cyclopentanol, cyclohexanol, cyclooctanol, cyclododecanol, and combinations thereof. Any aliphatic alcohol which is liquid and stable at the conditions within the vapor transport system may be used with the methods of the disclosure.

When the polar solvent is an aliphatic amide, in some embodiments, it may be selected from the group consisting of maleic amides, fumaric amides, itaconic amides, citraconic amides and acrylamides. In some embodiments, the aliphatic amide may be N, N-dimethylacrylamide and in other embodiments, it may be N-isopropylacrylamide or N-methacrylamide. In still other embodiments, the aliphatic amide may be N, N-diethylacrylamide. When a lactam is used, the lactam may be N-methyl-2-pyrrolidone. Any aliphatic amide which is liquid and stable at the conditions within the vapor transport system may be used with the methods of the disclosure.

When the polar solvent is an aliphatic ether, in some embodiments, it may be selected from the group consisting of diethyl ether, diisopropyl ether and t-butylmethyl ether combinations thereof. In other embodiments, the aliphatic either may be selected from the group consisting of n-propyl ether, n-butyl ether, n-amyl ether, isobutyl ether, isoamyl and ether and methyl butyl ether. Any aliphatic ether which is liquid and stable at the conditions within the vapor transport system may be used with the methods of the disclosure.

Polar solvents having both ether and alcohol functionalities may also be used. For example, in some embodiments of the disclosure, ethylene glycol butyl ether may also be used as the polar solvent.

Corrosion inhibitors that may be used with the methods of the disclosure include, but are not limited to, imidazoles and their derivatives, quaternary amines, acetylenic alcohols, pyrimidines, pyridazines, amides, carbamates, and their derivatives and combinations thereof. When the corrosion inhibitor is an imidazole, in some embodiments, it may be selected from the group consisting of benzimidazole, benzothiazole, bifonazole, butaconazole nitrate, clotrimazole, croconazole, eberconazole, econazole, elubiol, fenticonazole, fluconazole, flutimazole, isoconazole, lanoconazole, metronidazole, miconazole, neticonazole, omoconazole, oxiconazole nitrate, sertaconazole, sulconazole nitrate, tioconazole, thiazoles, and triazoles such as terconazole and itraconazole, and mixtures thereof. In other embodiments, the imidazoles may be selected from the group consisting of 1-benzyl-2-methylimidazole, 2-methylimidazole and 2-butylimidazole.

Imidazole derivatives that may be used with the methods of the disclosure include any aliphatic substituted imidazole. Any imidazoles or imidazole derivatives that are liquid at the operating conditions of the vapor transport system may be used.

When the corrosion inhibitor is a quaternary amine, it may be selected from the group consisting of quaternary ammonium compounds and quaternary amines having from about 2 to about 30 carbons. Exemplary quaternary amines useful with the method of the application include, but are not limited to, quaternized alkylpyridines, quaternized fatty amines. Any quaternary amine which is liquid and stable at the conditions within the vapor transport system may be used with the methods of the disclosure.

When the corrosion inhibitor is an acetylenic alcohol, the acetylenic alcohol may be selected from the group consisting of such alcohols having from about 3-16 carbon atoms. In some embodiments, ethyl octynol, propargyl alcohol, hexynol may be used as the corrosion inhibitor. In other embodiments, methyl butynol, methyl pentynol, hexynol, ethyl octynol, propargyl alcohol, benzyl butynol, naphthalyl butynol, and the like may be used. Any acetylenic alcohol which is liquid and stable at the conditions within the vapor transport system may be used with the methods of the disclosure.

When the corrosion inhibitor is a pyrimidine, it may be substituted or unsubstituted. When substituted, is some applications, it may be substituted with oleic, naphthenic, or fatty type alkyl groups. For example, coco or tall oil alkyl groups. Amides and carbamates may be similarly substituted. In some embodiments, these compounds may have more than a single substitution.

The corrosion inhibitors useful with some embodiments of the disclosure may have more than one functional group. For example, in some embodiments, the corrosion inhibitor may have both imidazole and amide functionality. In other embodiments, the corrosion inhibitor may have other combinations. Any polyfunctional corrosion inhibitor known to those of ordinary skill in the art may be used with the method of the application.

In the methods of the disclosure, the vapor transport system is substantially water free. For the purposes of this application, the term "substantially water free" means that the vapor being transported within the vapor transport system has less than 2000 ppm of condensed water present.

The additives of the application have at least two components, a polar solvent and a corrosion inhibitor. These compounds are present in a ratio to each other of from about 1:99 to about 99:1 in some embodiments and from about 1:9 to about 9:1 in other embodiments. When other components are present, such as a foulant morphology modifier, the concentration of the polar solvent and corrosion inhibitor may be from about 1% to about 99%.

In the practice of the invention, the vapor transport system is used to transport acidic materials. For the purposes of this application, the term "acidic materials" means compounds capable of forming sufficient hydronium ions in the presence of electrolyte to be corrosive to most mild steel. In some applications, the acidic materials will be the source of fouling. For example, where a copolymer is being prepared with maleic anhydride and the maleic anhydride is plugging a vapor recovery system, maleic acid and anhydride is both the foulant and the acid material transported within the vapor transport system.

In contrast, where butene is being transported with an acid material such as anhydrous HCl, and the butene is polymerizing to produce polybutene which is fouling the system, then the HCl is the acid material, but in this embodiment, the polybutene is the foulant.

As already stated, HCl; butene, and maleic anhydride may be components within a vapor transport system as practiced by the methods of the application. Other components that may also be used with the methods of the application include, but are not limited to 2,5-furandione, phthalic anhydride, and the like.

In the methods of the application, the additive is a liquid at vapor transport system operating conditions. For the purposes of the application, this means that the additive, when added to the vapor transport system, is a liquid and below its boiling point although, like any liquid, the additive may have a vapor pressure and evaporate over time.

The additives useful with the methods of the applications are stable at the vapor transport system operating conditions. In the practice of these methods, the additive does not decompose and remains effective for, in some embodiments, at least 24 hours under the conditions of the vapor transport system. Since conditions will vary depending upon the application being served by the vapor transport system, an operator of such a system will well know how to specify/select the additive that meets the needs of his particular application. For example, a high temperature application will require a polar solvent and corrosion inhibitor that have a boiling point greater than the operational temperature of the system. In addition to temperature, other conditions that may be present in the vapor transport system (and in some embodiments controllable by an operator thereof) include pressure, vapor flow rates, and the selection of components present in the vapor being transported.

While not wishing to be bound by any theory, it is nevertheless believed that employing a polar solvent in an acidic vapor transport system, while effective at reducing fouling, will result in corrosion due to the interaction of the acidic materials and the solvent and any latent water that may be present in the solvent. This is, of course, undesirable. The synergistic combination of the polar solvent and the corrosion inhibitor allow for the prevention or mitigation of fouling without excessive corrosion within the system.

In addition to the other properties, the additives used with the methods of the disclosure do not act as surfactants or otherwise cause scrubber failures. Scrubber failures may have safety and environmental consequences. At the very least they can cause loss of productivity.

The additives of the application are desirably introduced into the vapor transport systems at an effective concentration. Those of ordinary skill in the art of running such units are well versed in determining the effective concentration of additives to use in their equipment. Such concentrations are dictated by the operational conditions of the equipment. For example in some application, the additives are introduced at a rate of 5000 ppm. In other applications, the additives are introduced at a rate of 50 ppm.

The additives of the application may be introduced into vapor transport systems using any process known to be useful to those of ordinary skill in the art of running such systems. Methods of application may include online cleanup of existing deposition material via intermittent additive injection, and prevention of deposition via continuous additive injection.

In addition to the additive components already described, the additives of the disclosure may include other compounds known to be useful. Any compound that does not have an undesirable interaction with the additive's ability to prevent fouling may be used with at least some embodiment of the method of the invention.

Current solutions to the deposition problem include the use of mechanical cleaning that requires process shutdown limiting plant production capacity. Application of the additive may reduce or eliminate mechanical cleaning, system down time, and permit increased operational utilization thus increasing production capacity.

EXAMPLES

The following examples are provided to illustrate the present invention. The examples are not intended to limit the scope of the present invention and they should not be so interpreted. Amounts are in weight parts or weight percentages unless otherwise indicated.

Example 1

74 parts N-methyl-2-pyrrolidone, 20 parts ethylene glycol butyl ether, 3 parts alkylated succinic acid, and 3 parts heavy aromatic solvent are admixed to form a solution. Lab testing was conducted by adding a typical vent line deposit sample composed of poly-butene and 2,5-furandione and their derivatives, into the additive at a weight ratio of one part deposit per ten parts of additive. A test vial containing the mixture was kept isothermal in a water bath heated to 170° F. No agitation was applied to the mixture. Within 30 minutes, the deposit was completely disintegrated, converted into "flow-able" form and suspended in the bulk additive phase.

The same test was repeated in a mixture of the additive and concentrated hydrochloric acid (~37%) to evaluate the performance in presence of hydrogen chloride. Within 30 minutes, the deposit was completely dissolved. This test confirmed the efficacy of the additive in acidic environment.

Emulsifying tendency of the additive formulation in saturated hydrochloric acid was also tested. No emulsion formation was observed in the test.

Example 2

The corrosion potential of the additive formulations on Monel 400 metallurgy in presence of anhydrous hydrogen chloride was determined. The testing procedure included purging HCl (g) through the test liquid to saturation, suspending a Monel 400 coupon into the test liquid, sealing the test sample container and settling it at 170° F. for an extended period of time. The corrosion rate is calculated based on weight loss of the coupon through the test due to corrosion. Without an effective corrosion inhibitor, the corrosion rate of the additive formulation was 84 MPY on Monel 400. With an effective corrosion inhibitor formulated into the additive, the corrosion rate was tested to be 17 MPY, an 80% reduction.

The invention claimed is:

1. A method for the production of chemical compositions comprising transporting anhydrous vapor through metal pipes and introducing into the vapor transport system an additive comprising a polar solvent and corrosion inhibitor wherein:

the vapor transport system is substantially water free;

the vapor transport system is used to transport at least one acidic material;

the additive is a liquid at vapor transport system operating conditions; and the additive is stable at the vapor transport system operating conditions;

wherein the polar solvent is: an aliphatic amide selected from the group consisting of N,N-dimethylacrylamide, N-isopropylacrylamide, N-methacrylamide, N,N-diethylacrylamide, and combinations thereof; or the polar solvent is N-methyl-2-pyrrolidone.

2. The method of claim 1 wherein the at least one acidic material is also a source of fouling.

3. The method of claim 1 wherein the additive is introduced into the vapor transport system continuously.

4. The method of claim 3 wherein the continuous introduction of the additive functions to prevent or mitigate deposition of fouling deposits.

5. The method of claim 1 wherein the additive is introduced into the vapor transport system intermittently.

6. The method of claim 5 wherein the intermittent introduction of the additive functions to at least partially remove existing fouling deposits.

7. A method for the production of chemical compositions comprising transporting anhydrous vapor through metal pipes and introducing into the vapor transport system an additive comprising a polar solvent and corrosion inhibitor wherein:

the vapor transport system is substantially water free;

the vapor transport system is used to transport at least one acidic material;

the additive is a liquid at vapor transport system operating conditions; and the additive is stable at the vapor transport system operating conditions;

wherein the corrosion inhibitor is a quaternary amine selected from the group consisting of quaternized alkylpyridines, quaternized fatty amines, and combinations thereof.

8. The method of claim 7 wherein the at least one acidic material is also a source of fouling.

9. The method of claim 7 wherein the additive is introduced into the vapor transport system continuously.

10. The method of claim 9 wherein the continuous introduction of the additive functions to prevent or mitigate deposition of fouling deposits.

11. The method of claim 7 wherein the additive is introduced into the vapor transport system intermittently.

12. The method of claim 11 wherein the intermittent introduction of the additive functions to at least partially remove existing fouling deposits.

* * * * *